United States Patent
Takahashi

(10) Patent No.: US 6,510,010 B1
(45) Date of Patent: Jan. 21, 2003

(54) REAL IMAGE MODE FINDER OPTICAL SYSTEM AND LENS

(75) Inventor: Toshio Takahashi, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 67 days.

(21) Appl. No.: 09/704,701

(22) Filed: Nov. 3, 2000

(30) Foreign Application Priority Data

Nov. 5, 1999 (JP) ............................................ 11-314608

(51) Int. Cl.[7] ............................ G02B 3/02; G02B 27/14; G02B 15/14; G02B 13/06
(52) U.S. Cl. .................... 359/720; 359/432; 359/601; 359/631; 359/637; 359/676; 359/684; 396/382; 396/379; 396/452; 351/159; 355/53
(58) Field of Search ................................ 359/720, 432, 359/431, 601, 637, 631, 663, 678, 689, 740, 728, 868; 396/382, 384, 386, 379, 452; 355/53, 55; 351/159, 43

(56) References Cited

U.S. PATENT DOCUMENTS

| | | | |
|---|---|---|---|
| 4,730,910 A | * | 3/1988 | Humphrey ................. 359/601 |
| 5,323,264 A | * | 6/1994 | Kato ........................... 359/432 |
| 5,640,632 A | | 6/1997 | Koyama et al. ............. 396/382 |
| 5,726,738 A | * | 3/1998 | Sohn et al. ..................... 355/53 |
| 5,754,269 A | * | 5/1998 | Benjamin et al. ........... 351/159 |
| 6,041,193 A | * | 3/2000 | Aoki ........................... 396/379 |
| 6,078,411 A | * | 6/2000 | Aoki ........................... 396/379 |
| 6,288,849 B1 | * | 9/2001 | Teramoto ..................... 359/720 |

FOREIGN PATENT DOCUMENTS

JP          9-211547          8/1997

* cited by examiner

Primary Examiner—Loha Ben
(74) Attorney, Agent, or Firm—Pillsbury Winthrop LLP

(57) ABSTRACT

A real image mode finder optical system includes an objective optical system with a positive refracting power, an image erecting optical system having a plurality of reflecting sections for erecting an image formed by the objective optical system, and an ocular optical system for introducing an erected image into an observer's eye. At least one lens of the objective optical system or the ocular optical system is configured to be rotational asymmetrical with respect to the optical axis, and a light-blocking member for blocking reflected light at the end face of the lens is provided adjacent to the lens or spaced away therefrom through air.

21 Claims, 7 Drawing Sheets

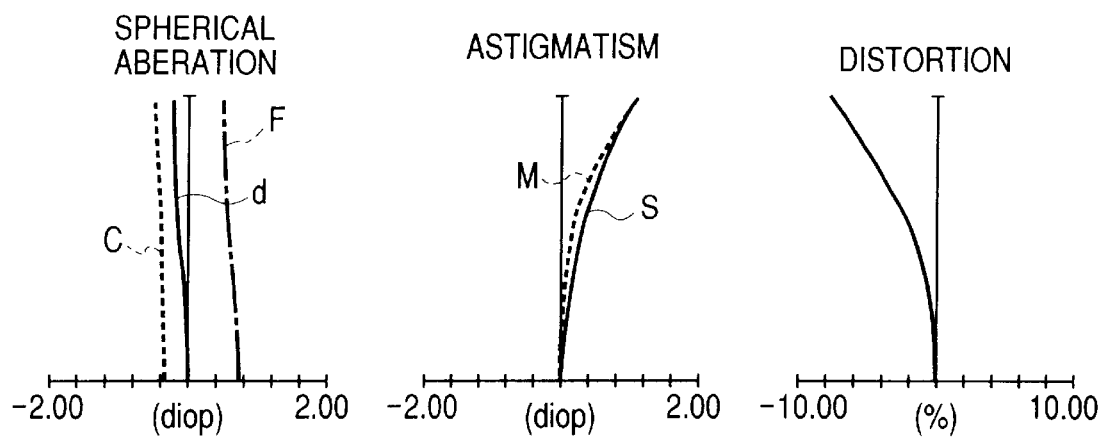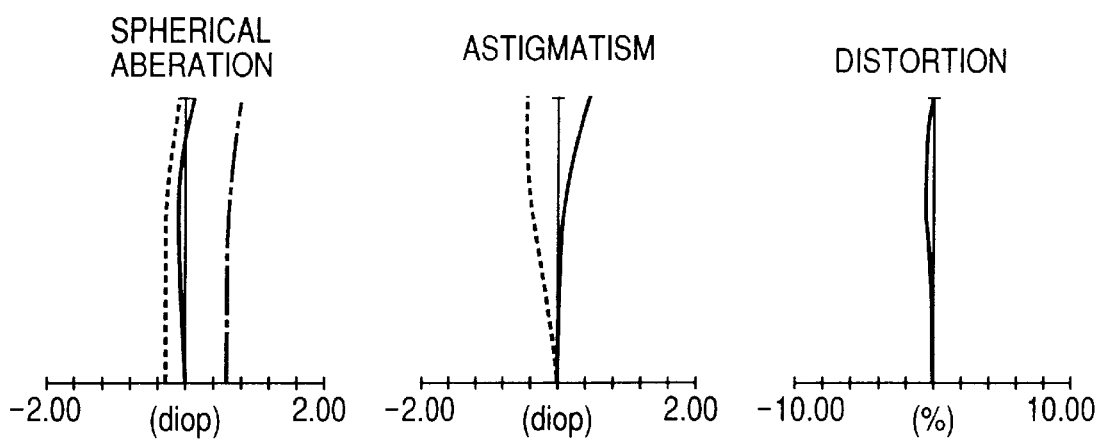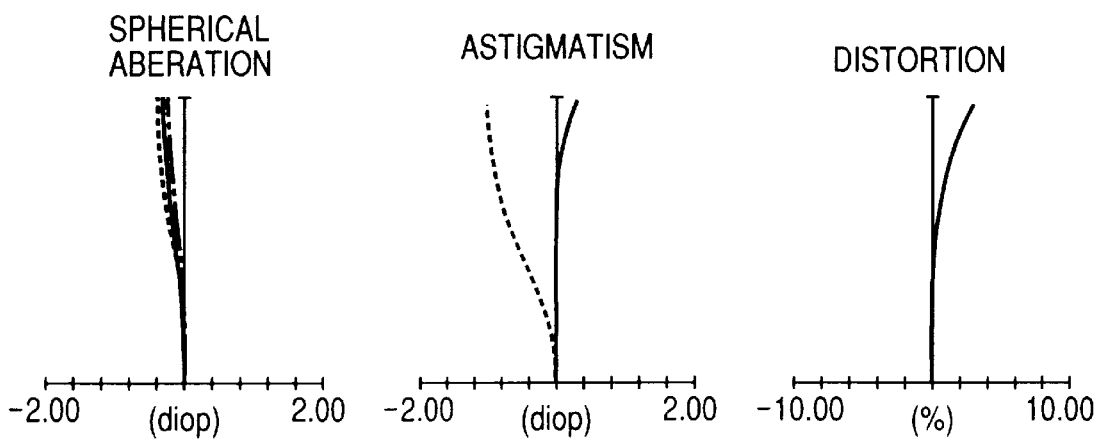

REAL IMAGE MODE FINDER OPTICAL SYSTEM AND LENS

BACKGROUND OF THE INVENTION

1. Field of the Invention

This invention relates to a real image mode finder optical system used in a camera for halide films, a digital camera, or a video camera.

2. Description of Related Art

A real image mode finder optical system has been used to make sure of a visual field for photography. In order to prevent flare produced by this real image mode finder optical system, various proposals have been made. For example, Japanese Patent Preliminary Publication No. Hei 9-211547 discloses a light-blocking means for preventing flare caused by a strong refracting power on the periphery of a lens in a finder when a pupil position is shifted from the optical axis. On the other hand, Japanese Patent Preliminary Publication No. Hei 6-95215 discusses a light-blocking means for eliminating stray light due to a light beam which is not reflected in an image erecting optical system.

However, no account is taken of light reflected by the end face of the periphery of a lens in any of technical prior art articles including the above publications, and thus flare or ghost is produced by reflected light. Alternatively, in order to prevent such flare, it is necessary to increase the diameter of a lens itself in the finder. This causes oversizing of the finder.

SUMMARY OF THE INVENTION

It is, therefore, a primary object of the present invention to provide a real image mode finder optical system which suppresses the production of ghost or flare, without enlarging a lens itself, and has a good view.

It is another object of the present invention to provide a real image mode finder optical system which has a configuration suitable for a reduction in the overall length.

It is still another object of the present invention to provide a real image mode finder optical system or lens which has a good view even when a lens with a gate produced in injection molding thereof is used.

In order to achieve the above objects, according to one aspect of the present invention, the real image mode finder optical system includes an objective optical system with a positive refracting power, an image erecting optical system having a plurality of reflecting sections for erecting an image formed by the objective optical system, and an ocular optical system for introducing an erected image into an observer's eye. In this case, at least one lens of the objective optical system or the ocular optical system is configured to be rotational asymmetrical with respect to the optical axis, and a light-blocking means for blocking reflected light at the end face of the lens is provided adjacent to the lens or spaced away therefrom through air.

According to another aspect of the present invention, the real image mode finder optical system includes an objective optical system with a positive refracting power, an image erecting optical system having a plurality of reflecting sections for erecting an image formed by the objective optical system, and an ocular optical system for introducing an image erected by the image erecting optical system into an observer's eye. In this case, an angle at which the optical axis is bent by the most object-side reflecting section of the image erecting optical system is acute, and the most image-side lens of the objective optical system is configured so that its end directed toward the optical axis bent by the most object-side reflecting section is cut out.

According to still another aspect of the present invention, the real image mode finder optical system is constructed so that an angle at which the optical axis is bent by the most object-side reflecting section of the image erecting optical system is acute, and at least one lens of the objective optical system is one of lenses constituting the objective optical system and has a shape that its end directed toward the optical axis bent by the most object-side reflecting section is cut out.

These and other objects as well as the features and advantages of the present invention will become apparent from the following detailed description of the preferred embodiments when taken in conjunction with the accompanying drawings.

BRIEF DESCRIPTION OF THE DRAWINGS

FIGS. 7A, 7B, and 7C are diagrams showing aberration characteristics at the wide-angle position of the real image mode finder optical system in FIG. 1;

FIGS. 8A, 8B, and 8C are diagrams showing aberration characteristics at the middle position of the real image mode finder optical system in FIG. 1;

FIGS. 9A, 9B, and 9C are diagrams showing aberration characteristics at the telephoto position of the real image mode finder optical system in FIG. 1;

DETAILED DESCRIPTION OF THE PREFERRED EMBODIMENTS

Figure 1:
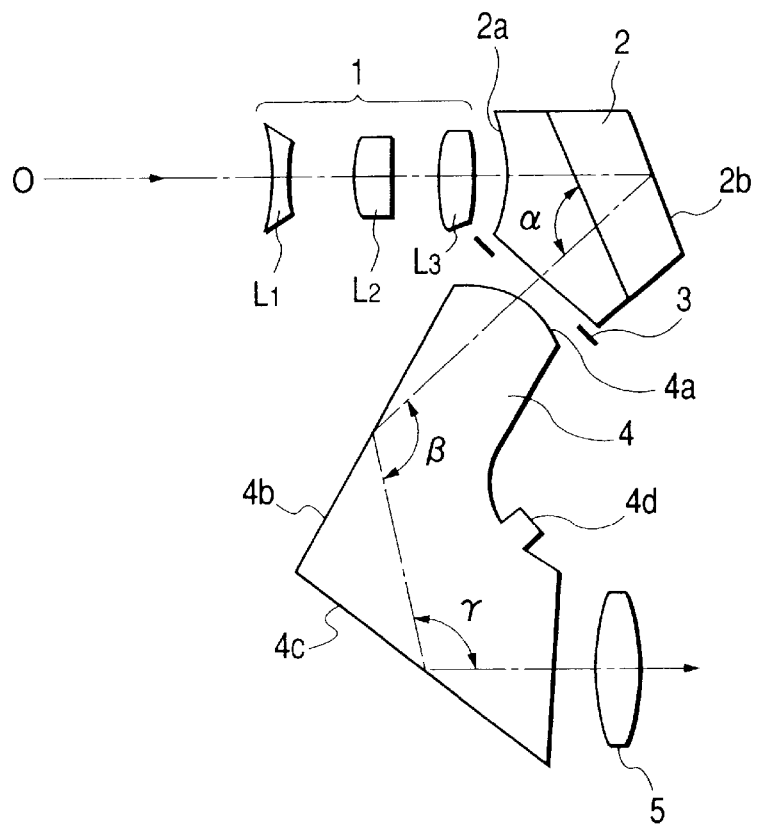
FIG. 1 is a sectional view showing schematically the arrangement of one embodiment of the real image mode finder optical system according to the present invention.

In accordance with the embodiments shown in the drawings, the present invention will be described below. FIG. 1 shows a schematic arrangement of one embodiment of the real image mode finder optical system according to the present invention. In this figure, reference numeral 1 represents an objective optical system including a first lens unit $L_1$ with a negative power, a second lens unit $L_2$ with a positive power, and a third lens unit $L_3$ with a positive power, arranged in this order from the object side; 2 represents a roof prism having an entrance surface 2a configured as an a spherical surface and a roof reflecting surface 2b as a reflecting section for bending an optical axis O at an acute angle, provided with a negative refracting power; 3 represents a field frame located at the position of an intermediate image formed by the objective optical system 1; 4 represents a synthetic-resin prism having an entrance surface 4a with a moderate curve, two reflecting surfaces 4b and 4c, and a gate 4d produced, in prism molding, on a surface through which a light beam is not transmitted; and 5 represents an ocular optical system. In this case, the roof prism 2 and the prism 4 constitute an image erecting optical system. The first lens unit $L_1$ remains fixed, while the second and third lens units $L_2$ and $L_3$ are moved along the optical axis O, and thereby zooming is performed. Since the entrance surface 4a of the prism 4 is moderately curved, ghost caused by light incident on this surface is eliminated. A proper selection is made so that a reflection angle α at the roof reflecting surface 2b is 48°, a reflection angle β at the reflecting surface 4b is 105°, and a reflection angle γ at the reflecting surface 4c is 123°. In this way, the finder optical system is designed so that its overall length is reduced.

Figure 2:
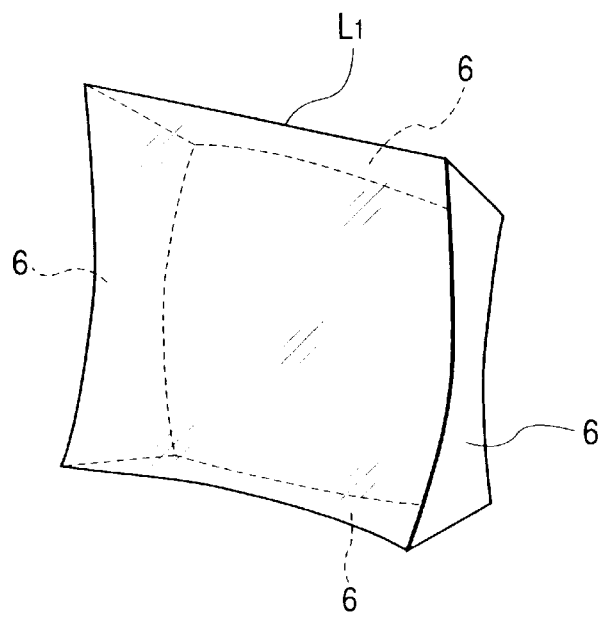
FIG. 2 is an enlarged perspective view showing a first lens unit of an objective optical system of the real image mode finder optical system in FIG. 1.

FIG. 2 shows a negative lens corresponding to the first lens unit $L_1$. This negative lens $L_1$, as shown in the figure, is shaped into a practically rectangular form that a portion other than that transmitting a normal beam is eliminated. The normal beam transmitted through the lens $L_1$ is converged toward the center of the objective optical system 1, and each of side faces 6 is inclined, to its shape, to progressively approach the optical axis O in going to the center of the objective optical system 1. Whereby, a light-weight design of the lens is achieved. If each side face 6 is parallel with the optical axis O, reflected light by each side face becomes liable to be introduced into an observer's eye, not shown. However, when the side faces are inclined, the reflected light is introduced into the perimeter of a lens barrel, not shown, of the objective optical system 1 and is absorbed so that ghost or flare is minimized. In this case, it is needless to say that when a light-blocking means for interrupting the reflected light is provided to the lens, the elimination of ghost or flare can be facilitated.

Figure 3:
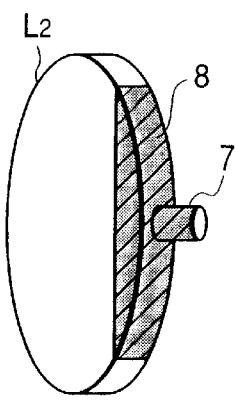
FIG. 3 is an enlarged perspective view showing a second lens unit of the objective optical system of the real image mode finder optical system in FIG. 1.

FIG. 3 shows a positive lens corresponding to the second lens unit $L_2$. This positive lens $L_2$ is disposed at a position where the normal beam is collected, and thus requires a small diameter. Consequently, even though a gate 7 produced in injection molding remains on the lens, the entire optical system will not be oversized. However, a surface accuracy is deteriorated in the proximity of the gate 7, and therefore, in this embodiment, a light-blocking coating 8 is applied only in the proximity of the gate 7 to improve optical performance.

Figure 4:
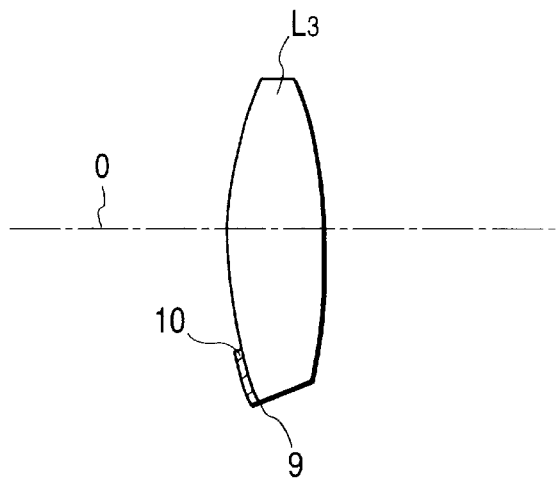
FIG. 4 is an enlarged sectional view showing a third lens unit, along the optical axis, of the objective optical system of the real image mode finder optical system in FIG. 1.
Figure 5:
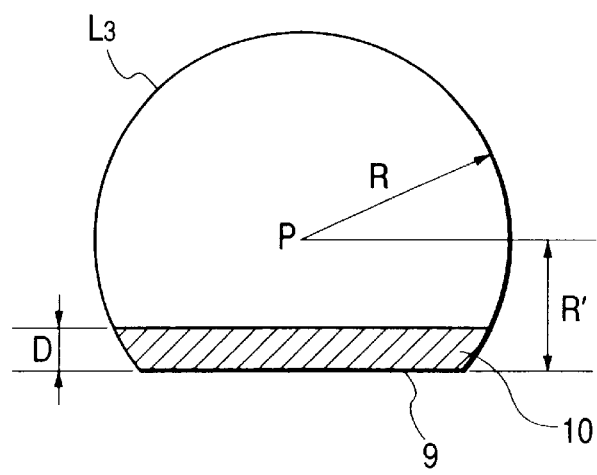
FIG. 5 is a view showing the third lens unit, looking from the left side of FIG. 4.

FIG. 4 shows a positive lens corresponding to the third lens unit $L_3$. FIG. 5 shows the positive lens, looking from the left side of FIG. 4. The positive lens $L_3$, as shown in FIG. 4, is configured so that an end 9 directed toward the optical axis O which is bent by the roof reflecting surface 2b is cut out straight, having a shape like the letter D as in FIG. 5. On the end face of the end 9, a light-blocking coating 10 is applied as a light-blocking means for interrupting a ray incident thereon. In the embodiment, the area of its application is chosen so that when a length from an axial position P to the farthest edge of an effective lens surface is denoted by R, a length from the axial position P to the nearest edge of the effective lens surface is denoted by R', a length of the light-blocking means extending toward the axial position P from the nearest edge of the effective lens surface is denoted by D, and an axial thickness of the lens is denoted by d, R=2.75 mm, R'=2.3 mm, D=0.68 mm, d=1.7093 mm, D/R'÷0.296, and d/R÷0.622.

Figure 6A:
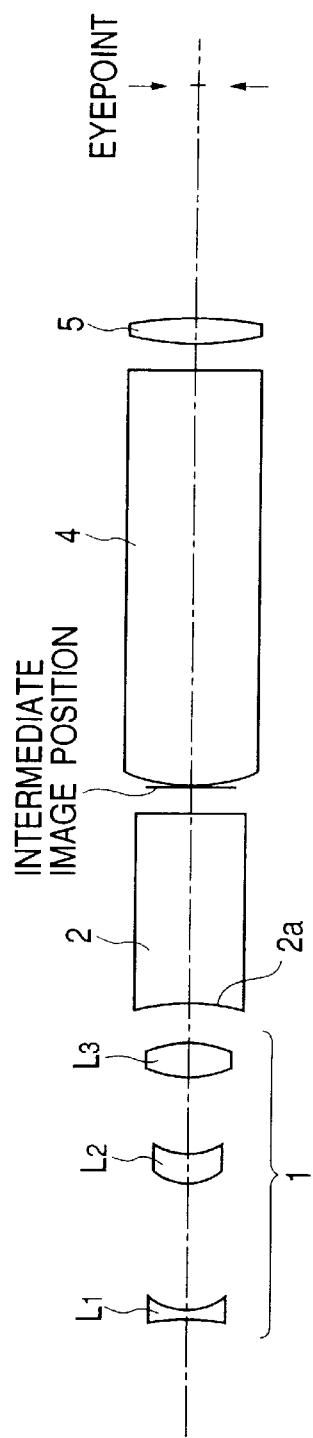
FIGS. 6A, 6B, and 6C are views showing arrangements, developed along the optical axis, at wide-angle, middle, and telephoto positions, respectively, of the real image mode finder optical system in FIG. 1.
Figure 6B:
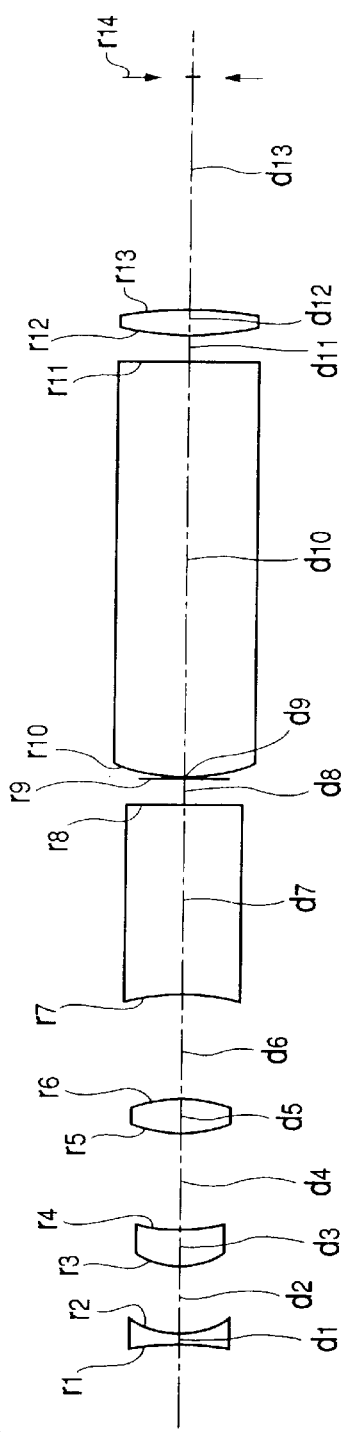
Figure 6C:

FIGS. 6A–6C show the arrangements, developed along the optical axis, of the real image mode finder optical system in the above embodiment.

Various numerical data of the finder optical system in the embodiment are shown below.

```
Finder magnification = 0.40–1.06x
Angle of incidence = 25.2–9.0°
Pupil diameter = 4 mm
Variable magnification ratio = 2.643
r₁ = –18.0525
                    d₁ = 0.7400      nd₁ = 1.58423   vd₁ = 30.49
r₂ = 8.3727 (aspherical)
                    d₂ = 7.7567 (wide-angle), 2.9430 (middle),
                    0.7000 (telephoto)
r₃ = 7.3181 (aspherical)
                    d₃ = 1.3143      nd₃ = 1.49241   vd₃ = 57.66
r₄ = 44.3998
                    d₄ = 1.8839 (wide-angle), 3.2421 (middle),
                    0.6446 (telephoto)
r₅ = 9.8215
                    d₅ = 1.7093      nd₅ = 1.49241   vd₅ = 57.66
r₆ = –12.5850
(aspherical)
                    d₆ = 1.9066 (wide-angle), 5.3487 (middle),
                    10.2007 (telephoto)
r₇ = –26.8623
(aspherical)
                    d₇ = 14.4000     nd₇ = 1.52542   vd₇ = 55.78
r₈ = ∞
                    d₈ = 1.5000
r₉ = ∞ (intermediate
image position)
                    d₉ = 0
r₁₀ = 10.6000
                    d₁₀ = 26.3805    nd₁₀ = 1.52542  vd₁₀ = 55.73
r₁₁ = ∞
                    d₁₁ = 1.7863
r₁₂ = 12.8880
(aspherical)
                    d₁₂ = 2.2210     nd₁₂ = 1.49241  vd₁₂ = 57.66
r₁₃ = –36.7301
                    d₁₃ = 17.3
r₁₄ = (eyepoint)
```

-continued

Conic constants and aspherical coefficients

Second surface

K =         −7.4745
A$_4$ =     9.4793 × 10$^{-4}$    A$_6$ =    7.8368 × 10$^{-5}$
A$_8$ =     −1.1259 × 10$^{-5}$   A$_{10}$ = 3.4350 × 10$^{-7}$

Third surface

K =         −0.5225
A$_4$ =     −6.7046 × 10$^{-4}$   A$_6$ =    1.1542 × 10$^{-4}$
A$_8$ =     −1.4425 × 10$^{-5}$   A$_{10}$ = 8.2692 × 10$^{-7}$

Sixth surface

K =         −10.8965
A$_4$ =     −2.8795 × 10$^{-4}$   A$_6$ =    3.1438 × 10$^{-5}$
A$_8$ =     −4.2576 × 10$^{-6}$   A$_{10}$ = 3.2600 × 10$^{--7}$

Seventh surface

K =         1.3058
A$_4$ =     −4.6174 × 10$^{4}$    A$_6$ =    −5.4411 × 10$^{-5}$
A$_8$ =     9.0328 × 10$^{6}$     A$_{10}$ = −5.2268 × 10$^{-7}$

Twelfth surface

K =         1.0137
A$_4$ =     −2.1030 × 10$^{-4}$   A$_6$ =    3.1374 × 10$^{-6}$
A$_8$ =     −1.6951 × 10$^{-7}$   A$_{10}$ = 3.0109 × 10$^{-9}$

FIGS. 7A–7C, 8A–8C, and 9A–9C show aberration characteristics in the finder of the embodiment.

In the numerical data described above, $r_1$, $r_2$, . . . represent radii of curvature of surfaces of individual optical elements such as lenses; $d_1$, $d_2$, . . . represent thicknesses of individual optical elements or spaces between them; $nd_1$, $nd_2$, . . . represent refractive indices of individual optical elements; and $vd_1$, $vd_2$, . . . represent Abbe's numbers of individual optical elements. Also, when X is taken as the coordinate in the direction of the optical axis, Y is taken as the coordinate normal to the optical axis, K denotes a conic constant, and $A_4$, $A_6$, $A_8$, and $A_{10}$ denote a spherical coefficients, the configuration each of the a spherical surfaces is expressed by the following equation:

$$X = \frac{Y^2/r}{1 + \sqrt{1 - (1+K)(Y/r)^2}} + A_4 Y^4 + A_6 Y^6 + A_8 Y^8 + A_{10} Y^{10}.$$

The embodiment is constructed as mentioned above, thereby achieving compactness and a reduction in the overall length of the finder optical system, the prevention of flare or ghost produced at a lens end face, and the improvement of performance.

Specifically, an area required to transmit an effective light beam is ensured and a finder lens is shaped into a rotational asymmetrical form in order to eliminate its unwanted portion. By doing so, the entire finder optical system can be downsized. However, at the end of the lens nearer the optical axis, there is a high possibility that a light beam incident thereon becomes flare or ghost, and thus a light-blocking means for interrupting reflected light produced at the end face of the rotational asymmetrical lens is provided adjacent to the lens. Whereby, compactness of the finder optical system and the minimization of ghost or flare are compatible with each other.

Furthermore, the angle at which the optical axis is bent by the most object-side reflecting surface of the image erecting optical system is made acute so that the optical axis is bent once toward the object side, and thus a reduction in the overall length of the real image mode finder can be achieved by the proper placement of subsequent reflecting surfaces. In this case, however, if the objective optical system interfaces with a bent path or its peripheral members, compactness of the finder optical system will be impeded. Hence, the most image-side lens, of lenses of the objective optical system, is shaped so that its end directed toward the bent axis is cut out. Consequently, since interference between the objective optical system and the bent path or the peripheral members can be prevented, a compact design of the real image mode finder optical system can be achieved. If the most image-side lens, of lenses of the objective optical system, is shaped into a D-like form, a sufficient amount of light can be ensured in an area other than an eliminated area of the lens, which is further favorable.

Figure 10:
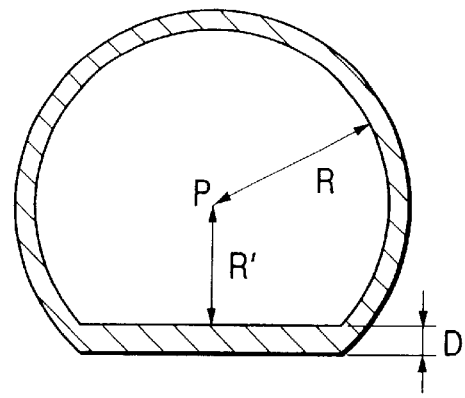
FIG. 10 is a view showing a modified example of the third lens unit of the objective optical system in FIG. 4.
Figure 11:
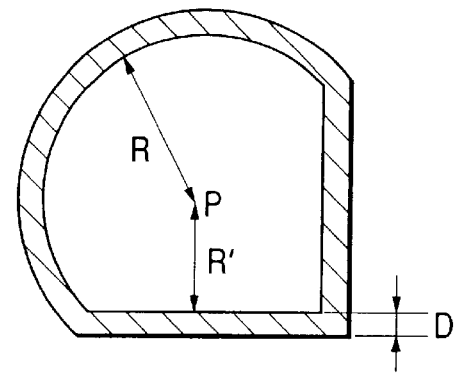
FIG. 11 is a view showing another modified example of the third lens unit of the objective optical system in FIG. 4.
Figure 12:
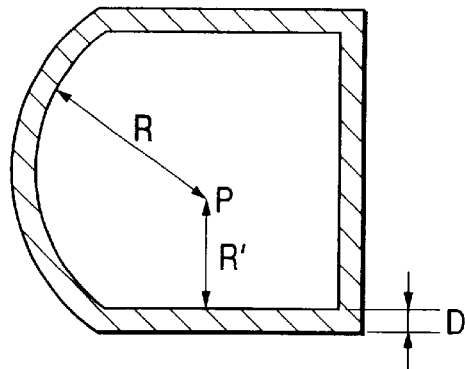
FIG. 12 is a view showing still another modified example of the third lens unit of the objective optical system in FIG. 4.
Figure 13:
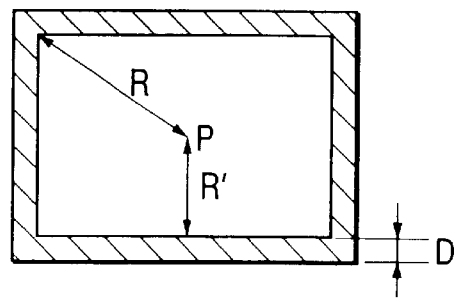
FIG. 13 is a view showing a further modified example of the third lens unit of the objective optical system in FIG. 4.

Also, although in the above embodiment the light-blocking means is provided adjacent to only the end of the D-like shaped lens in which a part of a lens is cut out, the present invention is not limited to this technique. Specifically, the light-blocking means, as shown in FIG. 10, may be provided in such a way as to interrupt light over the entire periphery of the D-like shaped lens; as shown in FIG. 11, over the entire periphery of a lens whose end is cut out in two directions; as shown in FIG. 12, over the entire periphery of a lens whose end is cut out in three directions; or as shown in FIG. 13, over the entire periphery of a lens whose end is cut out in four directions. Other various configurations are possible. The same holds for the lens with the gate, and the lens may be shaped into a D-like form so that light is blocked from the gate side. A way to block light may involve the use of a stop located at a slight distance away from the front surface of the lens, not to speak of the use of a coating.

The objective optical system may be constructed with lenses with negative, positive, and negative powers, for instance, or may also have a single focal point, so that various arrangements can be used.

Figure 14:
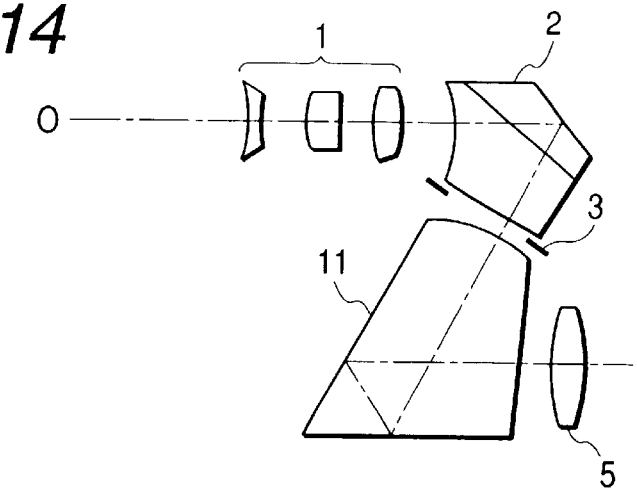
FIG. 14 is a sectional view showing schematically the arrangement of another embodiment of the real image mode finder optical system according to the present invention.
Figure 15:
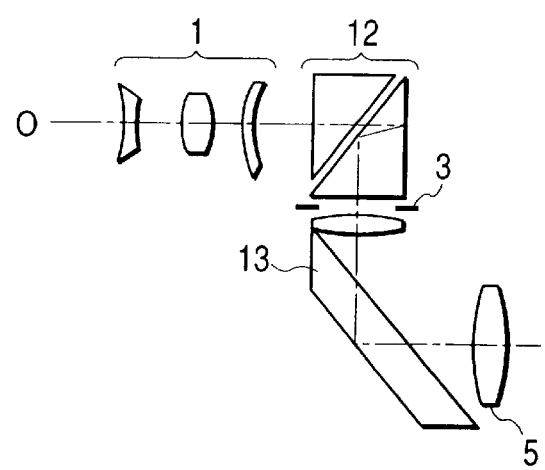
FIG. 15 is a sectional view showing schematically the arrangement of still another embodiment of the real image mode finder optical system according to the present invention.
Figure 16:
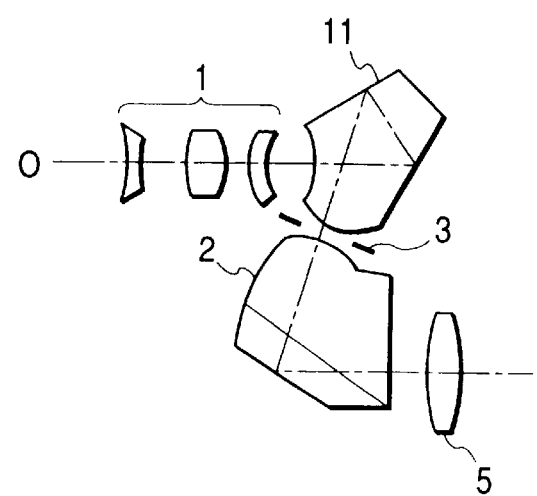
FIG. 16 is a sectional view showing schematically the arrangement of a further embodiment of the real image mode finder optical system according to the present invention.
Figure 17:
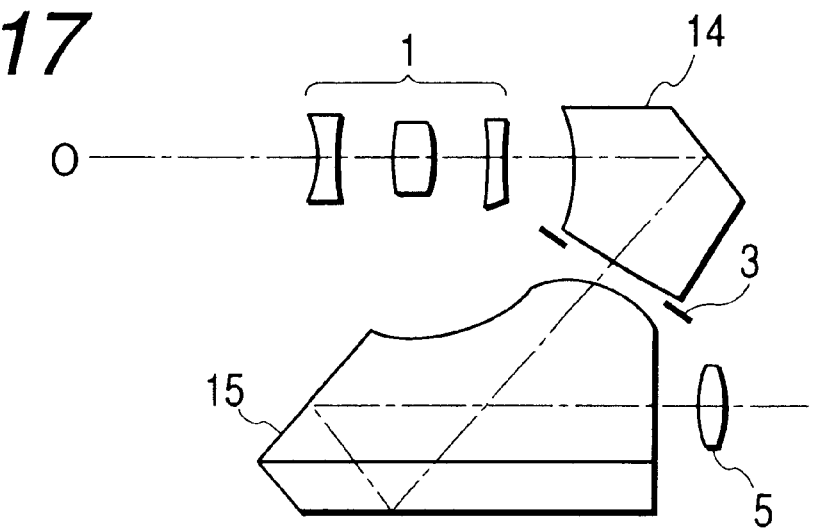
FIG. 17 is a sectional view showing schematically the arrangement of a still further embodiment of the real image mode finder optical system according to the present invention.
Figure 18:
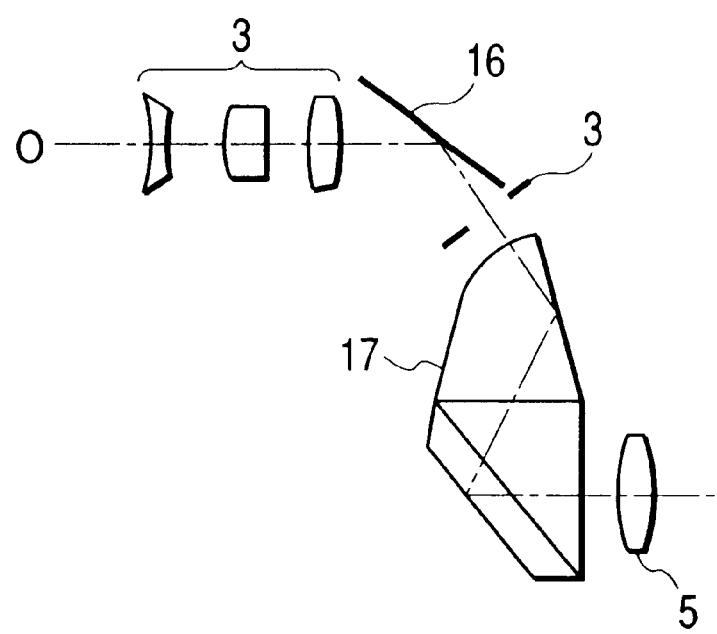
FIG. 18 is a sectional view showing schematically the arrangement of a more embodiment of the real image mode finder optical system according to the present invention.

The image erecting optical system is also not limited to the construction of the embodiment and is capable of using a variety of combinations. For example, the image erecting optical system, as shown in FIG. 14, may use a combination of the roof prism 2 with a pentaprism 11; as shown in FIG. 15, a combination of two wedge-shaped prisms 12 with a roof mirror 13; as shown in FIG. 16, a combination of the pentaprism 11 with the roof prism 2; as shown in FIG. 17, a combination of a triangular prism 14 with a pentagonal roof prism 15; and as shown in FIG. 18, a combination of an obtuse-angle reflecting plane 16 with a prism 17 having a roof reflecting surface in which light follows a Z-shaped optical path.

The lens units $L_1$, $L_2$, and $L_3$ constituting the objective optical system 1 are sometimes moved along the optical axis because of zooming, and thus a projecting for lens movement, not shown, may be molded integrally with each of the lens units.

In general, the real image mode finder optical system according to the present invention has the following features in addition to the first to third aspects.

1. In the real image mode finder optical system described in the third aspect, the most image-side lens of the objective optical system is configured so that its end directed toward the optical axis bent by the most object-side reflecting section is cut out. Whereby, provision is made against interference with respect to a lens which is most liable to interfere, and thus this is suitable for a reduction in the overall length of the finder. When the most image-side lens of the objective optical system is shaped into a D-like form, a sufficient amount of light can be ensured in an area other than an eliminated area of the lens, which is further favorable.

2. In the real image mode finder optical system described in the second or third aspect or item 1, an angle a at which the optical axis is bent satisfies a condition: 40°<α<65°. If the angle a exceeds the lower limit of the condition and becomes smaller, the bending angle of the optical axis will be extremely small and the objective optical system becomes liable to interfere with the bent path or its peripheral members. Beyond the upper limit, the image erecting optical system is enlarged, which is disadvantageous for compactness of the finder.

3. In the real image mode finder optical system described in the first aspect, the light-blocking means is provided on the surface of the lens of the objective optical system. Consequently, a space between the light-blocking means and the lens surface can be eliminated to reduce the thickness of the entire lens unit. Moreover, there is no need to consider a troublesome fabrication error such as a mounting error of the light-blocking means. When a light-blocking coating is applied to the object-side surface of the lens, a lens construction becomes simple, which is favorable.

4. In the real image mode finder optical system described in the first or third aspect or item 1 or 3, the light-blocking means is provided at only the end of the lens at which a part of the lens is cut out. Whereby, the amount of detrimental light is reduced in an area in which ghost or flare is liable to be produced and a necessary amount of light can be ensured in the other area.

5. In the real image mode finder optical system described in the first or third aspect or item 1 or 3, the light-blocking means is provided over the entire periphery of the lens and the aperture of the central portion of the lens through which a light beam passes is shaped into a D-like form so that an end nearest the optical axis is configured to be substantially straight. Whereby, the amount of detrimental light is reduced in an area in which ghost or flare is liable to be produced, and in the other area, it becomes possible to ensure the amount of light and to eliminate ghost or flare.

6. The real image mode finder optical system stated in the first or third aspect or item 1, 3, 4, or 5, satisfies conditions: $0.1<D/R'<0.4$ and $0.4<d/R<1.0$, where R is a length from an axial position P of the lens configured to be rotational asymmetrical to the farthest edge of an effective lens surface, R' is a length from the axial position P of the lens to the nearest edge of the effective lens surface, D is a length of the light-blocking means extending toward the axial position P from the nearest edge of the effective lens surface, and d is an axial thickness of the lens. If the value of D/R' is below the lower limit of the first condition, a light-blocking area will be reduced and ghost or flare will not be completely eliminated. Beyond the upper limit, the light-blocking area will be extremely increased, and a necessary light beam will be interrupted or the diameter of the lens must be increased. Thus, compactness of the finder cannot be achieved. If the value of d/R is below the lower limit of the second condition, the diameter of the lens must be increased or it becomes difficult to obtain a necessary refracting power, which is unfavorable. Conversely, if it exceeds the upper limit, ghost or flare will not be completely eliminated or a necessary amount of light will cease to be obtainable.

7. In the real image mode finder optical system stated in the second aspect or item 1 or 2, the end face of the end of the lens cut out is inclined to progressively approach the optical axis in going to the image erecting optical system. Whereby, interference between the bent path and the objective optical system can be obviated and further compactness of the finder is achieved. In particular, this is effective for the case where the end face of the most image-side lens of the objective optical system is cut out.

8. In the real image mode finder optical system stated in any one of the first to third aspects or items 1 to 7, the objective optical system includes, in order from the object side, a first lens unit with a negative refracting power, a second lens unit with a positive refracting power, and a third lens unit with a positive or negative refracting power, and the magnification of the finder is changed by varying a space between three lens units of the first, second, and third lens units. Consequently, the entire objective optical system can be constructed with a retrofocus type optical system, and hence it is possible to increase its back focal distance and to reduce the length of the arrangement of lenses. This is advantageous for a reduction in the overall length of the finder. Because of a zoom lens system, spaces for moving the lenses are required and the thickness of the entire finder optical system is liable to be increased. However, the above advantage of a reduction in the overall length of the finder prevents an increase in thickness of the finder.

9. In the real image mode finder optical system described in item 8, the most image-side lens of the objective optical system is moved to change the magnification. By doing so, even when a light beam is considerably varied by this magnification change, spaces for lens movement can be ensured without interfering with the image erecting optical system if the ends of moving lenses are cut out. Thus, a high variable magnification system can be realized.

10. The real image mode finder optical system includes an objective optical system with a positive refracting power, an image erecting optical system having a plurality of reflecting sections for erecting an image formed by the objective optical system, and an ocular optical system for introducing an image erected by the image erecting optical system into an observer's eye. In this case, at least one lens of the objective optical system is a rotational asymmetrical lens in which at least one part of the end of a lens is cut out, and the end face of the end of the lens cut out is inclined with respect to the optical axis. Consequently, where reflected light is introduced into the observer's eye when the end face is parallel to the optical axis, the end face is inclined with respect to the optical axis and thereby the direction of the reflected light can be changed. In this way, ghost or flare can be minimized.

11. In the real image mode finder optical system described in item 10, the end face is inclined to progressively approach the optical axis in going to the center of the objective optical system. Whereby, the optical path of a light beam required for the observation of an image is not interrupted, and a lightweight design of the lens can be achieved.

12. The real image mode finder optical system includes an objective optical system with a positive refracting power, an image erecting optical system having a plurality of reflecting sections for erecting an image formed by the objective optical system, and an ocular optical system for introducing an image erected by the image erecting optical system into an observer's eye. In this case, at least one lens of the objective optical system or the ocular optical system provides its end with a gate produced when the lens is made, and a light-blocking means for interrupting light entering the end on the gate side is provided adjacent to the lens or spaced away therefrom through air. Where a lens is configured of plastic, a lens surface in the area of the inlet of melt resin, namely, of a gate, generally suffers deterioration in surface accuracy, and thus, with light passing through this area, a good image may not be obtained. Hence, by providing the light-blocking means as mentioned above, a light beam incident on the area of the gate is interrupted, and only a light beam contributing to a good image is passed through the lens. In this way, a good image can be observed.

13. In the real image mode finder optical system described in item 12, the light-blocking means is provided on the surface of the lens. Whereby, a reduction in the overall length of the finder can be achieved, and there is no need to consider a troublesome fabrication error such as a mounting error of the light-blocking means. It is structurally favorable for the light-blocking means to apply a light-blocking coating to the object-side surface of the lens.

14. In the real image mode finder optical system described in item 12 or 13, the light-blocking means is provided at only the end of the lens in the area of the gate. Whereby, the amount of light transmitted through a portion deteriorated in surface accuracy is decreased and the amount of light in the other portion can be ensured.

15. In the real image mode finder optical system described in item 12 or 13, the light-blocking means is provided over the entire periphery of the lens and the aperture of the central portion of the lens through which a light beam passes is shaped into a D-like form so that the end with the gate is configured to be substantially straight. Whereby, the amount of light transmitted through an area deteriorated in surface accuracy is decreased, and in the other area, it becomes possible to ensure the amount of light and to eliminate ghost or flare.

16. A lens having a gate is provided with a light-blocking means at the end of the lens in the area of the gate.

17. A lens having a gate is constructed so that a light-blocking means is provided over the entire periphery of the lens and the aperture of the central portion of the lens through which a light beam passes is shaped into a D-like form so that an end with the gate is configured to be substantially straight.

18. In the lens described in item 16 or 17, the light-blocking means is provided on the surface of the lens.

According to the present invention, as mentioned above, a real image mode finder optical system which suppresses ghost or flare, without enlarging constituent lenses themselves, and has a good view can be provided. Further, a real image mode finder optical system which has a configuration suitable for a reduction in the overall length can be provided. Still further, a real image mode finder optical system which has a good view even when a lens with a gate is used can be provided.

What is claimed is:

1. A real image mode finder optical system comprising:
   an objective optical system with a positive refracting power;
   an image erecting optical system having a plurality of reflecting sections for erecting an image formed by said objective optical system; and
   an ocular optical system for introducing an erected image into an observer's eye,
   wherein at least one lens of said objective optical system or said ocular optical system is configured to be rotational asymmetrical with respect to an optical axis, and light-blocking means for blocking reflected light at an end face of said lens is provided adjacent to said lens or spaced away therefrom through air.

2. A real image mode finder optical system comprising:
   an objective optical system with a positive refracting power;
   an image erecting optical system having a plurality of reflecting sections for erecting an image formed by said objective optical system; and
   an ocular optical system for introducing an image erected by said image erecting optical system into an observer's eye,
   wherein an angle at which an optical axis is bent by a most object-side reflecting section of said image erecting optical system is acute, and a most image-side lens of said objective optical system is configured so that an end thereof directed toward the optical axis bent by said most object-side reflecting section is cut out.

3. A real image mode finder optical system according to claim 1, wherein an angle at which an optical axis is bent by a most object-side reflecting section of said image erecting optical system is acute, and said at least one lens is one of lenses constituting said objective optical system and has a shape that an end thereof directed toward the optical axis bent by said most object-side reflecting section is cut out.

4. A real image mode finder optical system according to claim 3, wherein a most image-side lens of said objective optical system is configured so that an end thereof directed toward the optical axis bent by said most object-side reflecting section is cut out.

5. A real image mode finder optical system according to claim 2 or 3, wherein a bending angle a of the optical axis satisfies a condition: $40° < \alpha < 65°$.

6. A real image mode finder optical system according to claim 1, wherein said light-blocking means is provided on a surface of said lens of said objective optical system.

7. A real image mode finder optical system according to claim 1 or 3, wherein said light-blocking means is provided at only an end of said lens at which a part of said lens is cut out.

8. A real image mode finder optical system according to claim 1 or 3, wherein said light-blocking means is provided over an entire periphery of said lens and an aperture of a central portion of said lens through which a light beam passes is shaped into a D-like form so that an end nearest the optical axis is configured to be substantially straight.

9. A real image mode finder optical system according to claim 1 or 3, satisfying conditions: $0.1 < D/R' < 0.4$ and $0.4 < d/R < 1.0$, where R is a length from an axial position P of said lens configured to be rotational asymmetrical to a farthest edge of an effective lens surface, R' is a length from the axial position P of said lens to a nearest edge of the effective lens surface, D is a length of said light-blocking means extending toward the axial position P from the nearest edge of the effective lens surface, and d is an axial thickness of said lens.

10. A real image mode finder optical system according to claim 2 or 3, wherein an end face of the end of said lens cut out is inclined to progressively approach the optical axis in going to said image erecting optical system.

11. A real image mode finder optical system according to any one of claims 1–3, wherein said objective optical system includes, in order from an object side, a first lens unit with a negative refracting power, a second lens unit with a positive refracting power, and a third lens unit with a positive or negative refracting power, and a magnification of a finder is changed by varying a space between three lens units of said first lens unit, said second lens unit, and said third lens unit.

12. A real image mode finder optical system according to claim 11, wherein a most image-side lens of said objective optical system is moved to change said magnification.

13. A real image mode finder optical system comprising:
   an objective optical system with a positive refracting power;
   an image erecting optical system having a plurality of reflecting sections for erecting an image formed by said objective optical system; and
   an ocular optical system for introducing an image erected by said image erecting optical system into an observer's eye,
      wherein at least one lens of said objective optical system is a rotational asymmetrical lens in which at least one part of an end of a lens is cut out, and an end face of the end of said lens cut out is inclined with respect to the optical axis.

14. A real image mode finder optical system according to claim 13, wherein said end face is inclined to progressively approach the optical axis in going to a center of said objective optical system.

15. A real image mode finder optical system comprising:
   an objective optical system with a positive refracting power;
   an image erecting optical system having a plurality of reflecting sections for erecting an image formed by said objective optical system; and
   an ocular optical system for introducing an image erected by said image erecting optical system into an observer's eye,
      wherein at least one lens of said objective optical system or said ocular optical system provides an end thereof with a gate produced when said lens is made, and light-blocking means for interrupting light entering the end on a gate side is provided adjacent to said lens or spaced away therefrom through air.

16. A real image mode finder optical system according to claim 15, wherein said light-blocking means is provided on a surface of said lens.

17. A real image mode finder optical system according to claim 15 or 16, wherein said light-blocking means is provided at only the end of said lens in an area of said gate.

18. A real image mode finder optical system according to claim 15 or 16, wherein said light-blocking means is provided over an entire periphery of said lens and an aperture of a central portion of said lens through which a light beam passes is shaped into a D-like form so that the end with said gate is configured to be substantially straight.

19. A lens having a gate, said lens being provided with light-blocking means at an end of said lens in an area of said gate.

20. A lens having a gate, said lens being constructed so that light-blocking means is provided over an entire periphery of said lens and an aperture of a central portion of said lens through which a light beam passes is shaped into a D-like form so that an end with said gate is configured to be substantially straight.

21. A lens according to claim 19 or 20, wherein said light-blocking means is provided on a surface of said lens.

* * * * *

UNITED STATES PATENT AND TRADEMARK OFFICE
CERTIFICATE OF CORRECTION

PATENT NO.    : 6,510,010 B1
DATED         : January 21, 2003
INVENTOR(S)   : Takahashi It is certified that error appears in the above-identified patent and that said Letters Patent is hereby corrected as shown below:

<u>Column 10,</u>
Line 46, change "angle a" to -- angle α --.

Signed and Sealed this

Twentieth Day of April, 2004

JON W. DUDAS
*Acting Director of the United States Patent and Trademark Office*